United States Patent

[11] 3,600,951

[72] Inventor Roger L. Easton
 Oxon Hill, Md.
[21] Appl. No. 806,640
[22] Filed Mar. 12, 1969
[45] Patented Aug. 24, 1971
[73] Assignee The United States of America as represented by the Secretary of the Navy

[54] ARRANGEMENT TO MEASURE AND COMPENSATE FOR CRYSTAL ORIENTATION CHANGE
5 Claims, 3 Drawing Figs.

[52] U.S. Cl. .................................................. 73/382, 331/175
[51] Int. Cl. .................................................. G01v 7/04

[50] Field of Search.................................................. 73/382, 517; 33/204.3; 331/56, 162, 166, 175; 310/8.4

[56] References Cited
UNITED STATES PATENTS
1,975,516 10/1934 Nicolson ...................... 73/382
3,386,292 6/1968 Watson et al. .................. 73/517

Primary Examiner—Richard C. Queisser
Assistant Examiner—Herbert Goldstein
Attorneys—R. S. Sciascia, J. G. Murray and A. L. Branning ABSTRACT: Method and apparatus for symmetrically arranging two or more crystals so that changes of orientation can be measured but will not disturb the frequency of an ultrastable crystal oscillator.

INVENTOR
ROGER L. EASTON

BY *James D. Murray*
*R. Sciascia*
ATTORNEYS

INVENTOR
ROGER L. EASTON
ATTORNEYS

3,600,951

ARRANGEMENT TO MEASURE AND COMPENSATE FOR CRYSTAL ORIENTATION CHANGE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Before the era of artificial earth satellites, the accuracy of navigation had not improved beyond that available from celestial techniques; but with the introduction of satellite navigation systems a new order of accuracy became possible whereby navigational "fixes" accurate to within a few tenths of a mile are presently routinely obtained.

One of the new satellite navigational systems is termed TIMATION, an acronym for time navigation. In this system, the satellite contains a stable oscillator that precisely times and controls its transmissions. When these transmissions are received by the navigator he compares them with the outputs of his own precision oscillator and from this comparison determines his range from the satellite. Since the satellite's position is known it is a matter of relatively simple and well known techniques to determine the position of the navigator's ship.

Because the TIMATION technique requires that both the satellite and the navigator have precision oscillators and in consideration of factors of cost, weight, etc. it has become an obviously highly desirable goal to develop crystal oscillators having the same order of stability as atomic devices, i.e. to be stable within an error rate of a few parts in $10^{12}$ per day. To attain this goal, the Naval Research Laboratory and other laboratories have embarked on research programs intended to raise the stability of crystal oscillators.

That the uncompensated natural frequencies of crystals change for many reasons has long been known. Natural frequency shifts of large magnitude due to changes of environmental parameters, such as temperature, pressure, etc. have been recognized by even the early experimenters and appropriate compensatory circuitry has been fully developed. Natural frequency shifts of much smaller magnitude, such as result from varying the crystal stress pattern due to a change of gravitational orientation, have hitherto largely been ignored. However, in developing a crystal oscillator having the desired (atomic) stability level, such small natural frequency shifts must be considered and compensated for.

SUMMARY OF THE INVENTION

The invention disclosed herein pertains to methods and apparatus whereby the two or more crystals which control the oscillator frequency are arranged so that the small natural frequency shifts which occur because of a change of the gravitational orientation do not disturb the ultrastable operational frequency of the oscillator. The small frequency shifts are also measured to obtain an indication of the orientation of the vehicle, such as an aircraft or ship, which carries the oscillator.

OBJECTS OF THE INVENTION

It is, therefore, an object of the invention to provide an improved and highly stable crystal oscillator.

Another object is to provide a method for compensating for the natural frequency shifts which occur in a crystal because of a change in the gravitational orientation.

Yet another object is to provide means for measuring the gravitational orientation of an aircraft or ship.

Still a further object is to provide a method and apparatus for compensating for a natural frequency shifts which occur in a crystal because of a change in the gravitational orientation by selecting and symmetrically arranging two or more crystals so that the sum of the natural frequencies of the crystals does not vary with changing gravitational orientation and the difference of the natural frequencies of two of the crystals is a measure of the gravitational orientation.

DESCRIPTION OF THE DRAWINGS

Other objects and advantages of the invention will become apparent to those skilled in the art as the disclosure is made in the following description of a preferred embodiment of the invention as illustrated in the accompanying drawings in which.

DESCRIPTION OF THE PREFERRED EMBODIMENT

Figure 1:
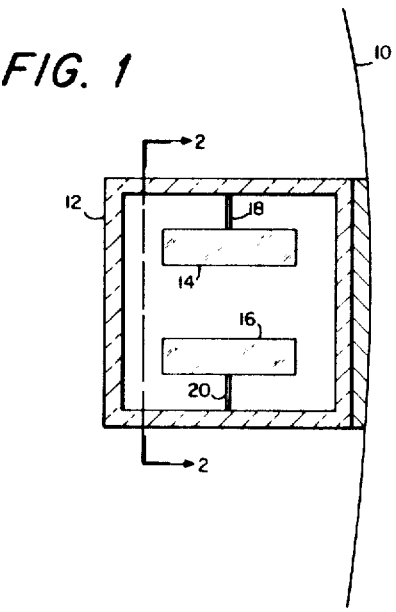
FIG. 1 is a plan view of the invention.
Figure 2:
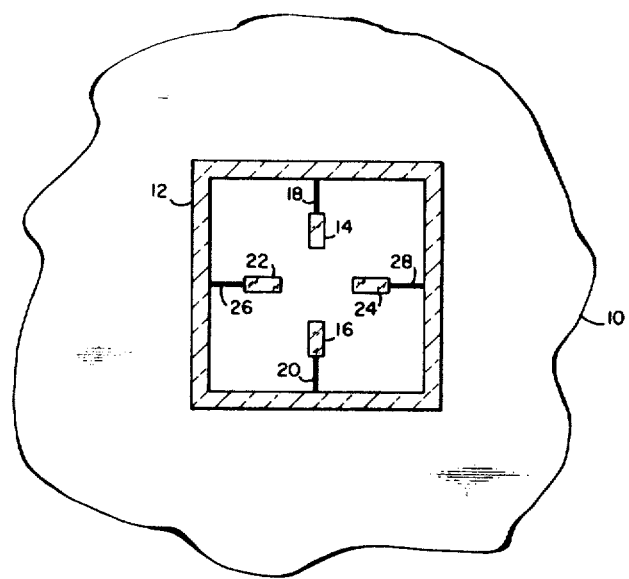
FIG. 2 is a side view taken on the line 2—2 of FIG. 1.

Referring now to the drawings, wherein like reference characters designate like or corresponding parts throughout the several views, there is shown in the plan view of FIG. 1 a portion of the structure of an aircraft or ship 10 on which is mounted the crystal oven 12 which functions in an entirely conventional manner to maintain the crystals 14 and 16 at a uniform temperature. As shown in FIGS. 1 and 2 the crystals 14 and 16 are attached by supports 18 and 20, the support 18 holding the crystal 14 from a direction that is opposite from the direction which support 20 holds crystal 16. As shown in FIG. 2 it may be further desired to include additional crystals 22 and 24, held from opposite directions by supports 26 and 28 respectively, and arranged in a pattern that is similar but perpendicular to that of crystals 14 and 16 and supports 18 and 20.

The reader will no doubt recognize that in FIGS. 1 and 2 the directions of supporting the crystals 14 and 16 (relative to the gravitational field) are purely illustrative and may change for a variety of reasons, such as when an aircraft maneuvers or a ship is in rough seas. Without the methods and apparatus of this invention, it has been found that the described changes in the crystal supporting direction (relative to gravity) introduce accompanying changes in the internal stress pattern in the crystal which may result in natural frequency shifts on the order of a few parts (or more) in $10^{11}$ per day. Frequency shifts of this magnitude, while usually ignored, are of intolerable consequence in an oscillator having as a desired goal the atomic clock stability of a few parts in $10^{12}$ per day. As will become more apparent from the continued disclosure of the invention, particularly from the description of FIG. 3, the methods and apparatus of the invention substantially eliminate the oscillator errors associated with frequency shifts caused by changing the crystal orientation with respect to the gravitational field.

Figure 3:
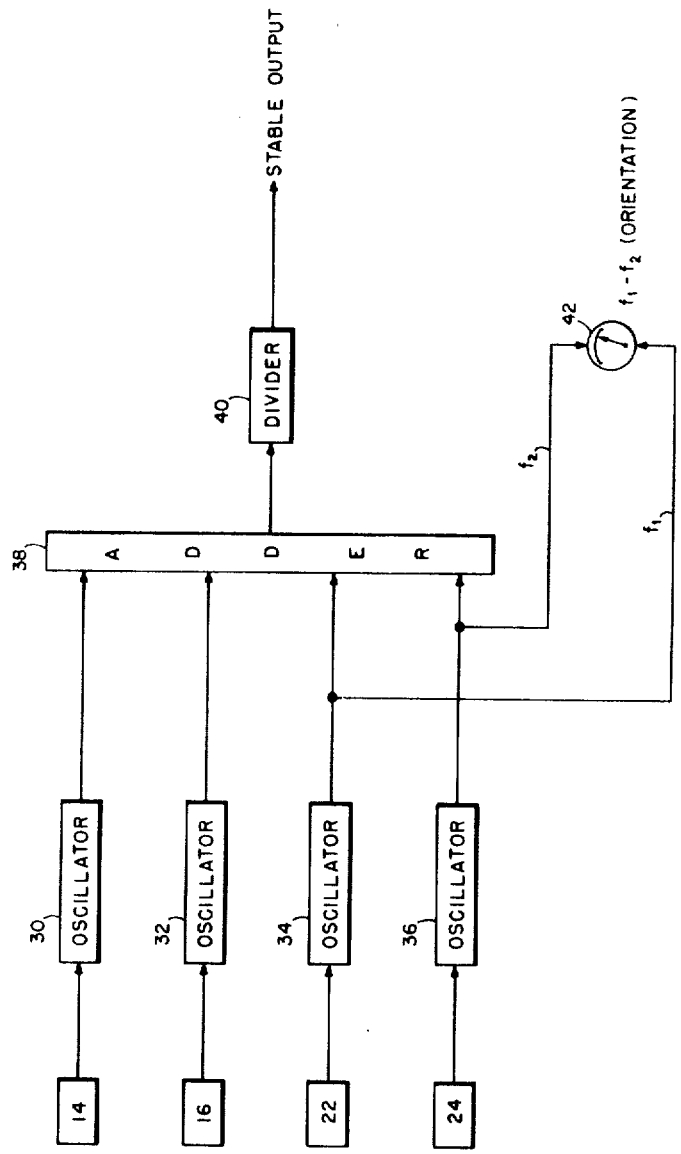
FIG. 3 is a circuit diagram of the electrical portion of the invention.

Referring now to FIG. 3, the crystals 14, 16, 22 and 24 are illustrated as connected to, and controlling the frequency of, the respective oscillators 30, 32, 34 and 36. The outputs of the oscillators are combined in adder 38, and if desired, reduced in frequency by the divider 40 to provide a stable output. The stable frequency output is accomplished by selecting the characteristics of crystals 14, 16, 22 and 24 so that errors occuring in one crystal due to a change of orientation relative to the gravitational field are compensated for in the other crystals. For example, let it be assumed that a 20° tilt of the aircraft or ship 10 in a certain direction relative to the direction of the gravitational field causes the natural frequency of crystal 22 (and the controlled frequency of oscillator 34) to be reduced 14 parts in $10^{12}$ per day, does not change the natural frequency of the crystals 14 and 16 and increases the natural frequency of the crystal 24 by a factor of 18 parts in $10^{12}$ per day. As the reader will comprehend, the invention reduces the error due to a change in gravitational orientation from 18 parts (in the output of crystal oscillator 24–36) to an error of only one part in $10^{12}$ per day in the output of adder 38 or divider 40.

The $f_1$ output of oscillator 34 and the $f_2$ output of oscillator 36 are compared by frequency difference meter 42 which produces an output indicative of the tilt of vehicle 10 with respect to the gravitational field. Similar circuitry, not illustrated, could obviously be connected to the output of the oscillators 30 and 32 and indicate the component of tilt of vehicle 10 in a direction orthogonal to the direction discussed in connection with the oscillators 34 and 36.

By now it will be apparent to the reader that there has been disclosed a method and apparatus for compensating for the natural frequency shifts which occur in a crystal because of a change in the gravitational orientation by selecting and symmetrically arranging two or more crystals so that the sum of the natural frequencies of the crystals does not vary with changing gravitational orientation and the difference of the natural frequencies of two of the crystals is a measure of the gravitational orientation.

Obviously many modifications and variations of the present invention are possible in the light of the above teachings. For example, the adder 38, divider 40 and meter 42 could be either digital or analog in nature. Further, a skilled person would realize that three pairs of crystals, rather than the two shown, could be arranged and supported in mutually perpendicular directions and the outputs of the three difference devices could be grouped into a simple computer which would provide a three dimensional indication of the tilt of the aircraft or ship 10. It is therefore to be understood, that within the scope of the appended claims, the invention may be practiced otherwise than as specifically described.

What is claimed and desired to be secured by Letters Patent of the United States is:

1. A method of obtaining a very stable output from crystal oscillators comprising the steps of:
   supporting in a symmetrical arrangement approximately matched crystals which control two or more oscillators in a manner such that the natural frequency shifts in the crystals caused by changing the gravitational orientation are compensatory and
   combining the outputs of said two or more oscillators,
   whereby the sum of said combined outputs is substantially independent of the gravitational orientation of said crystals.

2. The method of claim 1 including the further step of measuring the said natural frequency shifts in the crystals as an indication of said change of gravitational orientation.

3. A method of compensating for the change in frequency in a crystal oscillator caused by a change of orientation comprising the steps of:
   supporting in a symmetrical arrangement approximately matched crystals in a plurality of crystal oscillators in such a manner that the sum of the natural frequencies of said crystals is substantially independent of the orientation of said crystals and
   combining the outputs of said plurality of crystal oscillators.

4. The method of claim 3 including the further step of measuring the difference in natural frequencies of two of said crystals as an indication of the magnitude of said change of orientation.

5. A combination stable crystal oscillator system and an orientation indicator for use on a vehicle comprising:
   one or more pairs of crystals mounted in said vehicle, each pair of crystals being symmetrically supported and selected so that when one crystal rests on its support the other is suspended from its support and so that the sum of the natural frequencies of said pair of crystals is substantially independent of the orientation of said vehicle and each pair of crystals being arranged in a pattern that is orthogonal to the arrangement pattern of the others of said pairs of crystals;
   a plurality of oscillators individually connected to and controlled by a crystal of said one or more pairs of crystals;
   adding means connected to the outputs of said plurality of oscillators and functioning to combine said outputs and
   frequency difference measuring means connected to the outputs of the oscillators controlled by at least one of said pairs of crystals and functioning to measure the difference in the natural frequencies of said pair of crystals,
   whereby the output of said adding means is very stable and substantially independent of the orientation of said vehicle and the output of said frequency difference measuring means is a measure of the gravitational orientation of said vehicle.